United States Patent Office 3,431,188
Patented Mar. 4, 1969

3,431,188
PROCESS AND APPARATUS FOR
PHOTOCHEMICAL REACTION
Shoichi Ito, Ichiro Kawamoto, and Yoichiro Hara, Minami-ku, Nagoya, Japan, assignors to Toyo Rayon Kabushiki Kaisha, Tokyo, Japan, a corporation of Japan
Filed Nov. 18, 1964, Ser. No. 412,136
U.S. Cl. 204—157.1
Int. Cl. B01j 1/10, 1/00
8 Claims

ABSTRACT OF THE DISCLOSURE

A process for carrying out the photochemical reaction of a liquid reactant utilizing different degrees of apparent density of liquids and due to the inclusion of a gaseous reactant an apparatus for carrying out said process. The process utilizes a partition device in specific arrangement whereby the liquid reactant is caused to circulate inside and outside said partition device by gravity due to the difference in apparent density, resulting from the inclusion of gaseous reactant without any additional means for such operation.

---

Figure 1:
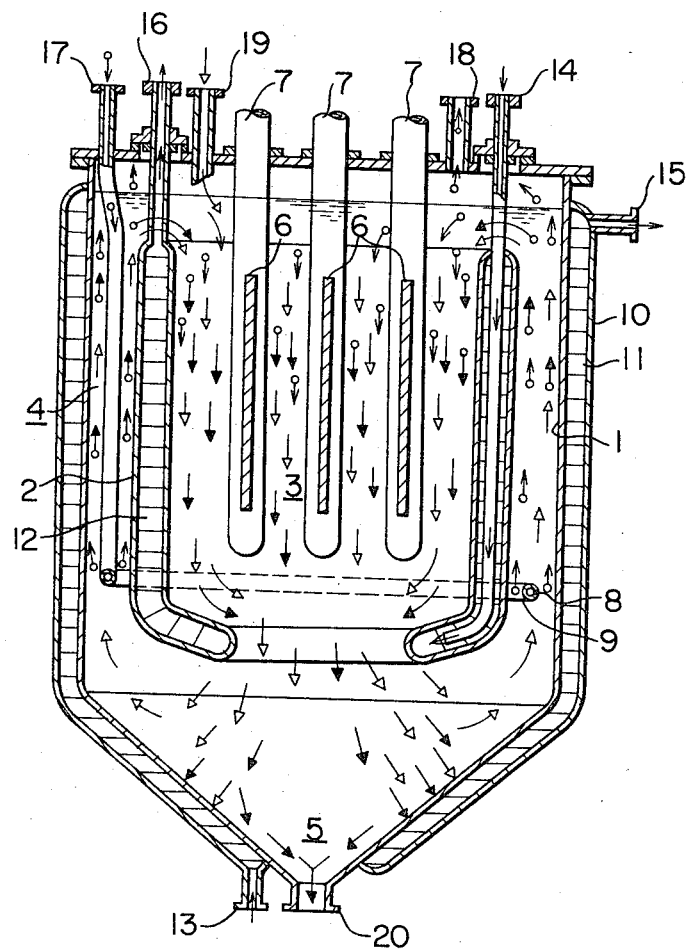

The present invention relates to a very advantageous commercial process for carrying out the photochemical reaction of a liquid reactant and a gaseous reactant utilizing the different degrees of apparent density of liquids due to the inclusion of a gaseous reactant, and also to an apparatus to operate said process. The process and equipment is already known which comprises immersing a light source in a liquid reactant, for example, cycloalkanes, continuously introducing a gaseous reactant, for example, gaseous nitroso agent to be absorbed into said liquid reactant and thereafter carrying out a photonitroso reaction in the solution into which said gaseous reactant has been absorbed. The present invention relates to improvements on the aforementioned process and equipment.

To improve the yield of reaction product not only in photonitroso reaction, but also in general photochemical reactions, it is required to supply necessary and sufficient quantities of light for the reaction. It is also necessary to remove considerable heat released from the light source depending on the light emitted therefrom as well as the reaction heat in order to keep the reactor temperature at an optimum level. Among the technical difficulties occurring when the reactor temperature rises noticeably higher than the optimum level, are included, for example, the development of side reactions and the resultant decreased yield of the main reaction product due to increasing amounts of side reaction products and the reduced yield per unit power, consumption by the light source and also the lowered quality of product.

Hitherto, the subject photochemical reaction has been conducted by immersing a light source in a liquid reactant charged into the reactor and directly introducing a gaseous reactant into said liquid reactant from below the light source thus immersed. The liquid reactant was cooled by the use of a cooling jacket provided outside the reactor. (This type of reactor may hereinafter be referred to as the "simple bubble tower type reactor.") The capacity of such reactor cannot be substantially increased due to the limited heat transfer area. To eliminate the defects of the previous method, an attempt was made to remove as much heat as desired by separately setting up a cooler outside the reactor so as to cool the liquid reactant. However, this method involved some disadvantages, namely, that large volumes of liquid reactant had to be circulated through the external cooler, that uneven temperature distributions occurred in the reactor, causing local increases in the temperature, and that speaking of the process, accessories such as an external cooler and a pump to circulate the liquid reactant were required in addition to the reactor itself. Thus the complicated construction of equipment eventually resulted in higher costs of manufacture and operation. Furthermore, the previous simple bubble tower type reactor was unsatisfactory in that the liquid reactant within the reactor was not fully stirred, thus giving a low overall heat transfer coefficient, namely, that heat removal per unit area are small.

Generally, the reactor must be charged with sufficient amounts of reactants to match the rate at which the reaction product is yielded. This is also true of the photonitroso reaction. For proper operation, the photonitroso reactor must be charged with the liquid reactant which has absorbed a gaseous reactant at optimum concentration to meet the rate at which the reaction product is obtained. Also in the photochemical reaction it is generally required to provide thick layers of the liquid reactant containing a gaseous reactant which are spaced a certain distance from the light source in order to give full play to the light energies in the reaction without losing them. The thickness of this liquid phase varies with the concentrations of the gaseous reactant absorbed into the liquid reactant. Where said concentrations are high, the liquid phase need not be thick, whereas in the case of low concentrations, said phase must be made sufficiently thick. In other words, in the reactor containing a constant liquid phase, where the liquid reactant which has absorbed a gaseous reactant is charged at too slow a rate to match the rate at which the reaction product is yielded, the light energies are lost.

Also in the photonitroso reaction, excess amounts of hydrogen chloride gas are mixed with the gaseous reactant in order to keep the concentration of the gaseous reactant absorbed into the liquid reactant at optimum levels and also to avoid the deterioration of the quality of the reaction product. This mixture (as in the foregoing description, hereinafter referred to as the "gaseous reactant") is absorbed into the liquid reactant. To maintain the optimum concentrations of the gaseous reactant in the liquid reactant, it is necessary to provide sufficient amounts of the liquid and gaseous reactants and also the sufficient depth of said liquid reactant to absorb said gaseous reactant.

The previous simple bubble tower type reactor had the disadvantage that due to insufficient agitation diffusion between the gas and liquid phases encountered considerable resistance. Consequently when a light source was used which generated extremely concentrated light intensities, the feed rate of the liquid reactant which absorbed the gaseous reactant at optimum concentration was liable to slow down as compared with the rate at which the reaction product was obtained, thus causing the losses of light energies. To avoid these difficulties, it was necessary to increase feed rate of the gaseous reactant into the liquid reactant, or to increase the depth of the liquid reactant absorbing the gaseous reactant or to provide thicker layers of the liquid phase required to absorb light by adding increased amounts of liquid reactant and thereby reducing the concentration of the gaseous reactant in said liquid reactant. The first two steps were unsatisfactory in that accessory facilities including a blower were subject to higher loads. The last-mentioned process required the reactor to be enlarged. This meant in turn that the yield per unit volume of the reactor decreased and that larger quantities of structural materials had to be used.

Upon the continuation of reaction, opaque tarry matter deposits on the outer wall of a transparent protective jacket for the light source which is placed between said light source and the liquid reactant and it interrupts the penetration of light into said liquid. This tarry matter is a denatured form of the reaction product which develops near the protective jacket, and, while depositing on the outer wall of said jacket, undergoes the action of strong light and nitroso agent.

When the liquid reactant near the protective jacket contains highly concentrated nitroso agent, a great deal of strong light is absorbed there and large amounts of the reaction product are yielded. Therefore there are more possibilities of said product depositing on the protective jacket. Moreover, since strong light and the liquid reactant containing highly concentrated nitroso agent are present near the protective jacket, the deposition of said opaque tarry matter tends to increase. The rate at which this tarry substance develops varies with the concentrations of nitroso agent in the liquid reactant. When said agent is highly concentrated, the tarry matter is rapidly produced upon the continuation of reaction and completely prevents the light from penetrating into the liquid reactant. In the case of optimum concentrations, however, the development of tarry matter progresses very slightly at a slow tempo as time goes on after the initiation of reaction. After lapse of a certain length of time, when the light energies are heavily lost due to the opaque tarry deposit the rate at which the reaction product is yielded and the feed rate of aqueous reactant (which is charged at a fixed flow rate) become unbalanced, with the result that the concentration of nitroso agent in the liquid reactant rises higher and the deposition of tarry matter is rapidly accelerated, thus sharply reducing the yield of reaction product per unit power consumption. Since it is impossible to continue reaction under such conditions, operation is suspended and the opaque tarry matter is dissolved and washed away with a solvent such as sulfuric acid. When the operating conditions are thus restored to the original state reaction is started again. The duration from the initiation to the stoppage of reaction is conveniently named the stable period.

In the previous simple bubble tower type reactor, the liquid reactant flowed in irregular directions and stirring in the reactor was not sufficiently carried out. The gaseous reactant was conducted into the liquid reactant from below the light source immersed in said liquid reactant (the point at which the gaseous reactant was introduced was substantially apart from the light source). Therefore there were many chances that bubbles containing highly concentrated nitroso agent or the liquid reactant containing highly concentrated nitroso agent around the bubbles were brought into contact with the transparent protective jacket provided between the liquid reactant and the light source. Consequently the opaque tarry matter was more apt to deposit on the protective jacket, causing not only the reduced yield per unit power consumption, but also the shortening of the stable reaction period itself. As previously described, where the nitroso agent contained in the gaseous reactant and light were present, both the nitroso agent and light acted on the reaction product and deteriorated its quality, thus complicating is refining process. Consequently to eliminate such effect, it was necessary to discharge the reaction product out of the system in as short a time as possible.

However, since the liquid reactant flowed in irregular directions in the previous simple bubble lower type reactor, it was impossible to remove the reaction product in the liquid reactant from the system positively and quickly. There was not other method of removal than by the gravitational precipitation of the reaction product.

As detailed above, the previous method or equipment for photochemical reaction which simply comprised introducing a gaseous reactant into a liquid reactant or additionally using agitation in said reaction had many unavoidable technical defects.

The object of the present invention is to provide a process and apparatus for photochemical reaction whereby many of the aforementioned difficulties can be overcome, and the per unit consumption of power used in the light source and the reaction rate per unit volume of the reactor can also be remarkably improved by utilizing the light energies from the source very profitably, without deteriorating the quality of the photochemical reaction product.

Many further objects and advantages of the present invention will be much clearer from the following description. When a photochemical reaction is carried out by conducting a gaseous reactant into a liquid reactant under the irradiation of light from the source immersed in said liquid reactant within the reactor, the object of the present invention is attained by providing between the light source and the inner wall of the reactor a partition device open at both the upper and lower ends and immersed in said liquid reactant and positioned in a surrounding relation with respect to said light source or preferably a partition device concurrently serving as a cooling unit through which a cooling medium is circulated and also by providing the gravity circulation of the liquid reactions inside and outside said partition devce due to their difference in apparent density resulting from the inclusion of the aforementioned gaseous reactant, and thereby carrying out the subject photochemical reaction. In this case the circulation of said liquid reactant may be made by either of the following two routes according to the manner in which the gaseous reactant is conducted into the liquid reactant. In one route the stream of the liquid reactant starts from the inside of the area surrounded by the partition device, flows between said partition device and the inner wall of the reactor through the upper opening and then returns to the aforesaid area inside said partition device through the lower opening of said partition device. In the other of the flow of said stream is reversed. The former route is used in introducing the gaseous reactant into the liquid reactant inside the partition device from below, and the latter is for the gaseous reactant to flow into the liquid reactant at the lower par of the vacant space defined by said partition device and the inner wall of the reactor.

When the gaseous reactant is thus introduced the liquid reactant which has absorbed said gaseous reactant goes up by the same principle of the bubble pump while being cooled, for example, by the partition device concurrently serving as a cooler, and starts circulation by gravity through either of the aforementioned routes depending on the manner in which the gaseous reactant is conducted. At this time a photochemical reaction takes place by the action of light from the light source. The reaction product and the unreacted liquid reactant are separated from each other at the reactor bottom. The reaction product is quickly collected from the discharge pipe at the reactor bottom, and the unreacted liquid is recirculated.

Figure 2:
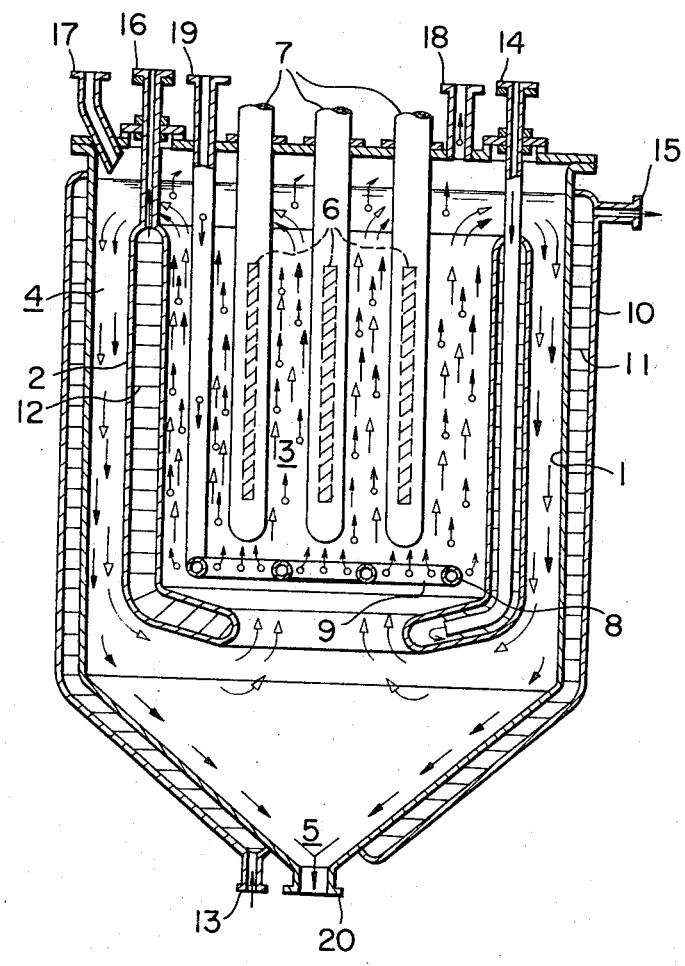

The process and apparatus of the present invention will be explained in greater detail with reference to the attached diagram. The device to operate the process of the present invention is an apparatus for photochemical reaction which is characterized by installing a light source fitted with a protective jacket within a reactor provided with a liquid reactant inlet, a gaseous reactant duct, a reaction product outlet and an exhaust gas port, setting up between the outer wall of said protective jacket and the inner wall of the reactor a partition device open at both the upper and lower ends and positioned in a surrounding relation with respect to the light source, or preferably such a partition device concurrently serving as a cooler through which a cooling medium is circulated, forming by the outer wall of the partition device and the inner wall of the reactor a vacant space connected with the inside area defined by the partition device through its upper opening and inserting said gaseous reactant duct either at the bottom of the aforesaid inside area or at the bottom of the vacant space defined by the outer wall of said partition device and the inner wall of the reactor. FIG. 1 is a cross sectional diagram showing an example of the subject apparatus in which the jets of the gaseous reactant duct are opened to the lower part of the aforementioned vacant space. FIG. 2 is also a cross sectional diagram illustrating an example in which said jets are provided in the inside area surrounded by the partition device.

The present invention will be explained first with reference to FIG. 1. In this diagram a combination cooler and partition device 2 is installed in the reactor body 1 to divide said reactor into three areas: reaction zone 3, liquid reactant cooling zone 4 and separation zone 5. A bar-shaped light source 6 provided within a transparent protective jacket 7 is immersed in a liquid reactant within the reaction zone 3. The jets 8 for the gaseous reactant are bored around the distributing pipe 9 and opened to the lower part of the liquid reactant cooling zone 4. The outer periphery of the reactor body 1 is fitted with a cooling jacket 10 through which a cooling medium flows. The interiors of said cooling jacket 10 and the combination cooler and partition device 2 are provided with spiral ribs 11 and 12 respectively. The cooling medium introduced through ducts 13 and 14 respectively goes up in a rotating fashion through the cooling jacket 10 or the partition device 2, and is discharged from the exhaust ports 15 and 16 respectively. 17 is a gaseous reactant inlet, 18 is a port to discharge unreacted gaseous reactant, 19 is a liquid reactant duct provided with an opening and 20 is a discharge pipe for reaction product.

In the apparatus as outlined above, reaction is carried out in the following manner. As shown in the diagram, the mark → shows the flow of a cooling medium, ⇢ the route of reaction product, → the route of liquid reactant, o→ the route of gaseous reactant, and o→ the route of the liquid reactant which has absorbed said gaseous reactant.

The gaseous reactant is introduced to be absorbed by the liquid reactant in the cooling zone 4 through a number of jets 8 provided below said zone and opening to the vacant space at the end of the gaseous reactant duct. The liquid reactant which has absorbed gaseous reactant flows upward while being cooled, by a principle similar to that of the bubble pump, and comes down from the top of the combination cooler and partition device 2 into the reaction zone 3 inside said combination unit. On the other hand the gaseous reactant also goes up while being absorbed into the liquid reactant. Same portions of the unabsorbed gaseous reactant enter said reaction zone 3 along the flow of the liquid reactant, and the balance is discharged from the system through the exhaust gas port 18 after passing through the surface layer of the liquid reactant. The liquid reactant which has absorbed the gaseous reactant entering the reaction zone 3 is made to react under the light from the bar-shaped light source 6. The reaction product yielded in said reaction zone 3 and the unreacted liquid reactant containing slightly lowered concentrations of gaseous reactant enter the separation zone 5. In this separation zone 5 the reaction product and the unreacted liquid reactant containing slightly lowered concentrations of gaseous reactant impinge upon the bottom plate of the reactor body 1. This impingement causes the reaction product to be separated from the unreacted liquid reactant containing slightly lowered concentration of gaseous reactant. The reaction product thus separated from the outlet 20 provided at the reactor bottom. On the other hand the unreacted liquid reactant lighter than the reaction product flows upward into the cooling zone 4 after being stripped of the reaction product by impingement on the bottom plate of the reactor body 1. Said unreacted liquid reactant outering the cooling zone 4 repeatedly goes through the same cycle as above described.

Since the process of the present invention uses the partition device or preferably combination cooler and partition device 2 and the reactor body 1 as heat transfer media for the cooling of the liquid reactant as outlined above, the cooling area per unit volume of the reactor increases. Consequently when it is intended to obtain larger yields per unit volume of the reactor using a light source of higher capacity, the process of the present invention can favorably attain said object. Furthermore, as compared with the previous device which used an external cooler, the apparatus of the present invention is much simpler in construction and easier of operation.

Since the liquid reactant is circulated utilizing the bubble properties of gaseous reactant, said apparatus requires less operating cost than the previous device which uses pumps and other means in circulation. In the process of the present invention, the reaction zone 3 and the cooling zone 4 are designed to have the same liquid level. Taking, therefore, the liquid level on the side of the reaction zone 3 as the standard, the rise in the liquid level on the side of the cooling zone 4, namely, the head thereof is almost zero. Consequently the volumes of liquid reactant in circulation increase due to the properties of the pump. Moreover, since the liquid and gaseous reactants go up in mixed streams through the cooling zone 4, the flow of said streams is more accelerated than in the previous simple bubble tower type reactor. This aspect becomes more prominent as the horizontal cross sectional area of the cooling zone 4 grows smaller than that of the reaction zone 3. As a result, the resistance to heat transfer on the side of the liquid reactant is reduced and the overall heat transfer coefficient increases. In other words the heat transfer efficiency per unit cooling area improves. In the apparatus of the present invention, therefore, the cooling area can be more reduced than in the previous simple bubble tower type reactor. In the process of the present invention large amounts of liquid reactant are circulated, and the inside of the partition wall defining the reaction zone 4, namely, the combination cooler and partition device also provides cooling. The temperature within the reactor is uniformly distributed and can be kept constant. Consequently it is possible to obtain stable, high quality reaction product.

With respect to the absorption of gaseous reactant into liquid reactant, resistance to diffusion between the gas and liquid phases as observed in the apparatus of the present invention is more reduced than in the previous simple bubble tower type reactor. This has been experimentally confirmed, and the reason is not yet fully clarified. At the present moment, however, the following explanation is considered most reasonable. In the cooling zone 4, the gas and liquid flow upward in parallel streams, whereas in the reaction zone 3 both streams flow downward. As described above, this circulating motion of the liquid reactant is more intensified than in the previous simple bubble tower type reactor. Such an accelerated flow of the liquid reactant causes the bubbles of smaller diameters included in the group of gaseous reactant bubbles to be sucked into the reaction zone 3 along the route of the liquid reactant after said group of bubbles has once risen to the neighborhood of the level of the liquid reactant. Thus the rising speed of bubbles (when the liquid reactant remains still) is smaller than the falling speed of the liquid reactant. The bubbles make the same circulating motion as the reactant. The bubbles of relatively large diameters which flow upward at the same speed as per liquid reacant runs down are retained in the reaction zone 3. The amounts of bubbles thus retained are slightly smaller than those retained in the cooling zone 4. Consequently the mean retention time of the gaseous reactant bubbles within the liquid reactant is presumed to be longer than in the previous simple bubble tower type reactor. Thus the over-all coefficient of material transfer apparently increases and resistance to diffusion between the gas and liquid phases sems to be reduced. As a result, in the apparatus of the present invention it is possible to use lesser amounts of gaseous reactant than required in the previous simple bubble tower type reactor and also to charge the liquid reactant which has absorbed optimum concentrations of gaseous reactant at a rate to match that at which the reaction product is obtained, thus eliminating the losses of light energies. Since the requirements of gaseous reactant per unit power consumption in the reaction is more reduced than before, accessory equipment including a blower is more relieved of the load. Also the reduced requirements of liquid reactant result in the increased yield per unit volume of the reactor.

The foregoing is an explanation of the apparatus to operate the process of the present invention as illustrated in FIG. 1. Also the process of the present invention can be carried out by another operating procedure which is the same as in the case of the apparatus of FIG. 1 except that the gaseous reactant is introduced under the cooling zone 3 as shown in FIG. 2 (in which the parts corresponding to those of FIG. 1 bear the same notations as those used in FIG. 1) instead of being charged from the jets 8 provided below the cooling zone 4 which is formed into an annular passage. In this case, too, the process of the present invention can be performed in exactly the same way except that as illustrated, the circulation of the system is an opposite direction to that which is used in the case of FIG. 1. The foregoing is a description of the apparatuses of FIGS. 1 and 2.

In the apparatus of the present invention, larger volumes of liquid are circulated through the reactor as described above than in the previous simple bubble tower type reactor and stirring is carried out more thoroughly. Since the liquid reactant which has absorbed gaseous reactant can be introduced into the reaction zone 3 at an almost uniform concentration, the concentration distribution of nitroso agent in the liquid reactant is reduced within said reaction zone 3. In the apparatus of FIG. 1, the nitroso agent in the gaseous reactant is more soluble in the liquid reactant than hydrogen chloride, so that most of said agent is absorbed in the cooling zone 4. Consequently the gaseous reactant which is sucked into the reaction zone 3 contains lower concentrations of nitroso agent. For this reason, the bubbles of gaseous reactants containing higher concentrations of nitroso agent are not brought into contact with the transparent protective jacket 7 of the light source. Then the apparatus of FIG. 1 is used the liquid reactant which has absorbed gaseous reactant flows, within the reaction zone 3, in parallel to the transparent protective jacket 7 from above downward. Consequently the gaseous reactant bubbles which have been sucked into the reaction zone 3 and the reaction product yielded are hardly brought into contact with said protective jacket 7. Thus there is less possibility that opaque tarry material attaches itself to said jacket 7. As a result, the yield per unit power consumption during the stable period not only increases, but also said period is extended. Since the frequency of dissolving and washing the tarry matter is reduced, solves used such as sulfuric acid are less required. Since the frequency of starting and stopping operation also decreases, losses of time resulting from repeated startups, and shutdowns are reduced.

As previously described, the process of the present invention involves the use of hydrogen chloride gas as a diluent of nitroso agent so as to prevent the reaction product from being deteriorated in quality. Said hydrogen chloride combines with the reaction product to make it a hydrochloric salt, and serves for the chemical stabilization of the reaction product. Also the gaseous reactant sucked into the reaction zone 3 mostly consists of hydrogen chloride gas and contains low concentrations of nitroso agents, so that the reaction zone 3 is provided with sufficient supplies of hydrogen chloride. Consequently it is possible to avoid the deterioration of product quality. This was impossible in the previous simple bubble tower reactor.

Furthermore, the reaction product obtained in the reaction zone 3 is forced downward along the route of the liquid reactant, and is quickly discharged out of the system after being separated from the liquid reactant in the separation zone 5, so that the reaction product is not retained long within the system as in the previous simple bubble tower type reactor. Consequently it is possible to improve the quality of the reaction product and simplify the refining step of the same. When the apparatus of the present invention is provided with a simple partition device through which a cooling medium is not circulated in place of the aforementioned combination cooler and partition device the yield per unit volume of the reactor decreases due to reduced heat transfer area, but other effects as above described can be achieved. Again where a cooling coil constructed similar to the combination cooler and partition device is used in its stead, the liquid and gaseous reactants in the cooling zone 4 leak into the reaction zone 3 through the openings of said coil and minor circulating motions occur between the tubes. In spite of such disadvantages, however, the same effects as realized by the apparatus of the present invention can be attained as a whole. Also the partition device as used in the process of the present invention may be such as will or will not permit the penetration of light. While it is suitably applicable to the photonitroso reaction of cycloalkanes as liquid reactant using the raw material of gaseous nitroso agent as gaseous reactant, the apparatus of the present invention can also be used in other general photochemical reactions.

Where cycloalkanes are used as a liquid reactant in the process of the present invention, the number of their carbon atoms is not particularly limited. However, cyclohexane, cyclooctane and cyclododecane are especially important. Said cycloalkanes may be used alone, or in mixture of two or more kinds of solutions in other adequate solvents. Since some of these cycloalkanes remain solid at room temperature and atmospheric pressure, it is necessary to dissolve them in adequate solvents in use.

The nitroso agents used in the process of the present invention may include gaseous materials such as nitrosyl chloride, mixtures of nitrogen monoxide and chlorine, and mixtures of nitroso gas and hydrogen chloride gas.

The type of light source and the intensity of light are not particularly restricted. They may be used under the known conditions.

Having described the specification, we claim:

1. Process for photochemical reaction which, in carrying out a photochemical reaction by introducing a gaseous reactant into a liquid reactant under the irradiation of light from the light source which is installed in said reactant within a reactor, is characterized by providing between said light source and the inner wall of the reactor a partition device open at both the upper and lower ends and completely immersed in said liquid reactant and positioned in a surrounding relation with respect to said light source and causing liquid reactants inside and outside said partition device to circulate by gravity due to their difference in apparent density resulting from the inclusion of said gaseous reactant.

2. Process described in claim 1 which is characterized by the fact that a cooling medium is circulated through said partition device.

3. Process described in claim 1 which is characterized by the fact that said gaseous reactant is introduced into the lower part of said liquid reactant inside said partition device.

4. Process described in claim 1 which is characterized by the fact that said gaseous reactant is introduced into the lower part of the liquid filled space defined by the outside of said partition device and the inner wall of said reactor.

5. Apparatus for photochemical reaction which is characterized by the fact that a light source fitted with a protective jacket is installed within the reactor provided with a liquid reactant inlet, gaseous reactant duct, reaction product outlet and exhaust gas port, that a partition device open at both the upper and lower ends and adapted to be completely immersed in said liquid reactant, is set up between the outer wall of said protective jacket and the inner wall of the reactor in a surrounding relation with respect to the light source, that a vacant space connected through said openings with the inside of the area surrounded by said partition device is formed by the outer wall of said partition wall and the inner wall of the reactor and that said gaseous reactant duct is opened to the lower part of the aforementioned area.

6. Apparatus described in claim 5 which is characterized by the fact that said partition device also serves as a cooling jacket through which a cooling medium can be circulated.

7. Apparatus for photochemical reaction which is characterized by the fact that a light source fitted with a protective jacket is installed within the reactor provided with a liquid reactant inlet, gaseous reactant duct, reaction product outlet and exhaust gas port, that a partition device open at both the upper and lower ends and adapted to be completely immersed in said liquid reactant is set up between the outer wall of said protective jacket and the inner wall of the reactor in a surrounding relation with respect to the light source, a vacant space connected through said openings with the inside of the area surrounded by said partition device is formed by the outer wall of said partition wall and the inner wall of the reactor and that said gaseous reactant duct is opened to the lower part of said vacant space.

8. Apparatus described in claim 7 which is characterized by the fact that said partition device also serves as a cooling jacket through which a cooling medium can be circulated.

References Cited
UNITED STATES PATENTS

| | | | |
|---|---|---|---|
| 1,954,438 | 4/1934 | Britton et al. | 204—163 |
| 2,200,254 | 5/1940 | Bender | 204—163 |
| 3,309,298 | 3/1967 | Ito et al. | 204—162 |

HOWARD S. WILLIAMS, *Primary Examiner.*

U.S. Cl. X.R.

204—158, 162, 163, 193